United States Patent [19]

Shoge et al.

[11] Patent Number: 5,732,598
[45] Date of Patent: Mar. 31, 1998

[54] SHIFTING APPARATUS FOR A BICYCLE

[75] Inventors: Akihiko Shoge, Shimonoseki; Masao Kojima, Izumi, both of Japan

[73] Assignee: Shimano, Inc., Osaka, Japan

[21] Appl. No.: 792,089

[22] Filed: Jan. 31, 1997

Related U.S. Application Data

[63] Continuation of Ser. No. 392,100, Feb. 22, 1995, abandoned.

[30] Foreign Application Priority Data

Feb. 23, 1995 [JP] Japan .................. 6-025016

[51] Int. Cl.⁶ .................. B60K 20/02; B62M 25/04
[52] U.S. Cl. .................. 74/475; 74/502.2
[58] Field of Search .................. 74/502.2, 475, 74/500.5

[56] References Cited

U.S. PATENT DOCUMENTS

| | | | |
|---|---|---|---|
| 3,091,130 | 5/1963 | Payerle et al. | 74/502.2 |
| 3,499,346 | 3/1970 | Ishida et al. | 74/502.2 |
| 3,524,979 | 8/1970 | Cohen | 240/2 |
| 3,633,437 | 1/1972 | Ishida | 74/489 |
| 4,461,189 | 7/1984 | Rottenkolber et al. | 74/502.2 |
| 5,134,897 | 8/1992 | Romano | 74/489 |
| 5,178,033 | 1/1993 | Kund | 74/501.5 R |
| 5,325,735 | 7/1994 | Nagano | 74/502.2 |
| 5,390,565 | 2/1995 | Tagawa et al. | 74/502.2 |

FOREIGN PATENT DOCUMENTS

| | | | |
|---|---|---|---|
| 0 423 779 A1 | 4/1991 | European Pat. Off. | B62K 23/04 |
| 1538932 | 7/1968 | France . | |
| 58-191682 | 8/1983 | Japan . | |
| WO93/18961 | 3/1993 | WIPO | B62M 25/04 |

Primary Examiner—Charles A. Marmor
Assistant Examiner—David M. Fenstermacher
Attorney, Agent, or Firm—James A. Deland

[57] ABSTRACT

A shifting apparatus for controlling a change gear device winding or unwinding a cable. The shifting apparatus essentially includes a control member rotatable about a handlebar, a takeup drum for winding the cable thereon, a positioning mechanism for retains the takeup element in each angular position, and an indicator for indicating a speed stage of the change gear device. The indicator is formed separately from the control member and takeup drum, and has an axis different from a rotational axis of the control member. The indicator may be installed in any desired orientation determined freely without regard to orientations of the control member and takeup drum. The shifting apparatus, therefore, has the indicator which is small but easy to see.

19 Claims, 7 Drawing Sheets

SHIFTING APPARATUS FOR A BICYCLE

This is a continuation of application Ser. No. 08/392,100, filed Feb. 22, 1995, now abandoned.

BACKGROUND OF THE INVENTION

1. Field of the Invention

The present invention relates to a shifting apparatus for a bicycle having a tubular control member rotatably mounted on a handlebar, a takeup element rotatable with the control member to wind or unwind a cable, an engaging mechanism for stopping the takeup element at a selected angular position, and an indicator for indicating speed stages of a change gear device operable by the cable.

2. Description of the Related Art

A conventional shifting apparatus for a bicycle as noted above is disclosed in Japanese Patent Publication Kokai No. 1983-191682, for example.

This conventional apparatus includes a speed indicator having a plurality of numeric marks provided in one end region of a control member. A guide block overlaps the end region of the control member, and defines a window-like opening in the overlapping potion thereof. With rotation of the control member, one numeric mark after another registers with that opening to indicate a selected speed stage.

Thus, in the above conventional apparatus, the indicator has a rotatable member thereof which is a portion of the control member and is therefore rotatable with the control member about the same axis. To facilitate observation of speed stage indications, at least a portion of the rotatable member is enlarged to present a large display surface, or the display surface is oriented in a way to facilitate view. However, this measure inevitably requires enlargement of the entire shifting apparatus, which is contrary to compactness of the shifting apparatus.

SUMMARY OF THE INVENTION

The object of the present invention is to provide a shifting apparatus for a bicycle having a compact overall construction with an indicator easily seen by the cyclist.

In order to fulfill the above object, the present invention provides an improvement on the type of shifting apparatus noted in the outset hereof, in which the indicator is formed separately from the control member and takeup element and has a rotational axis different from a rotational axis of the control member.

The feature that the indicator is formed separately from the control member and takeup element, and has a rotational axis different from a rotational axis of the control member, allows the indicator to be installed in any desired orientation determined freely without regard to orientations of the control member and takeup element. The indicator may have an entire display plane facing upward, rearward or inwardly of the bicycle to facilitate view by the cyclist. The shifting apparatus, therefore, has the indicator which is relatively small but easy for the cyclist to see. With the indicator small but located in a way to facilitate its view, the cyclist can easily discern speed stages indicated to effect shifting operations reliably, and yet the apparatus itself is small and attachable to the handlebar compactly.

In arranging the indicator on a rotational axis different from the rotational axis of the control member, the axis of the indicator may not cross the axis of the control member at one point. As shown in an embodiment, the takeup element and control member may have a common axis, with the indicator having an axis extending substantially perpendicular to that common axis. This allows the apparatus to be formed compact so that the entire indicator is disposed very close to the handlebar. That is, the apparatus becomes compact in terms of both arrangement of the indicator and arrangement of the takeup element, to be attachable to the handlebar with increased simplicity.

The indicator may have a varied display plane facing upwardly or rearwardly of the bicycle. Further, the indicator may employ a varied interlocking mechanism between a rotatable member thereof and the control member or an engaging mechanism. As shown in an embodiment in particular, the indicator may have a display plane inclined inwardly of the bicycle. This indicator displays speed stages toward the cyclist to facilitate view and shifting operations.

Further, as shown in one embodiment, the indicator may include a rotatable member interlocked to the takeup element, and a fixed member attached to a frame. With these rotatable member and fixed member, the indicator may be formed compact so that the indicator is disposed very close to the handlebar. That is, the apparatus becomes compact in terms of arrangement of the indicator and arrangement of the takeup element, to be attachable to the handlebar with increased simplicity.

The takeup element may be arranged in varied ways, e.g. to be rotatable about a different axis to the control member. As shown in one embodiment in particular, the takeup element may be arranged on the rotational axis of the control member, with the indicator attached to a frame disposed inwardly of the bicycle with respect to the control member and covering the takeup element. With the above positional relationship between the takeup element and control member and the attachment of the indicator to the frame, the takeup element may be mounted on the handlebar as arranged along the rotational axis, and the indicator may be disposed very close to the takeup element to achieve compactness. That is, the apparatus becomes compact in terms of arrangement of the indicator and arrangement of the takeup element, to be attachable to the handlebar with increased simplicity.

The shifting apparatus may be attached to the handlebar independently of a brake lever. However, as shown in an embodiment, the shifting apparatus may have a bracket extending from the frame for pivotally supporting a brake lever. Then, the brake lever may be attached to the handlebar, utilizing a construction that attaches the shifting apparatus to the handlebar. This allows the brake lever and shifting apparatus to be attached as a unit to the handlebar, and that in a compact manner.

The frame of the shifting apparatus and the brake lever bracket may be formed of an identical material to be integral with each other. The integration of the frame and bracket realizes a relatively compact construction for attaching the shifting apparatus and brake lever to the handlebar. That is, the apparatus may be formed compact in the aspect of its attachment.

Other features and advantages of the present invention will be apparent from the following description of the preferred embodiments taken with reference to the drawings.

DETAILED DESCRIPTION OF THE PREFERRED EMBODIMENTS

Figure 1:
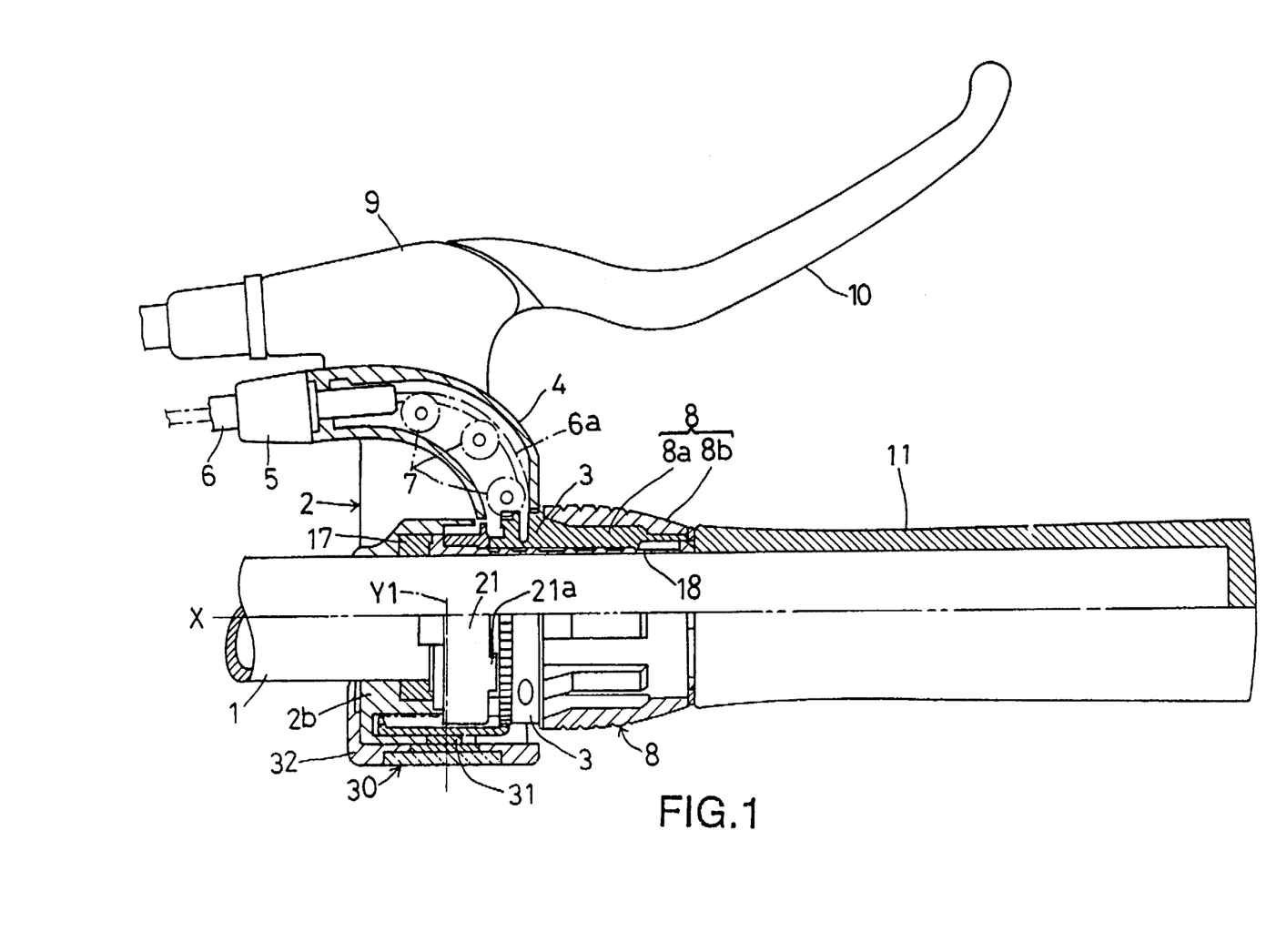
FIG. 1 is a sectional view of a shifting apparatus for a bicycle with a brake lever according to the present invention.

As shown in FIG. 1, a frame 2 has a band 2a (whose details being shown in FIG. 3) fastened tight to a bicycle handlebar 1. The frame 2 contains a wire takeup element 3. The frame 2 includes a wire receiving case 4 formed integral therewith and having an outer holder 5 for supporting a control cable 6 extending from a change gear device (not shown) of the bicycle. The control cable 6 has an inner wire 6a guided from the outer holder 5 into the frame 2 by way of a plurality of guide rollers 7 arranged inside the wire receiving case 4. The inner wire 6a is connected to the takeup element 3. The takeup element 3 is rotatable by a control member 8 disposed outside the frame 2. The takeup element 3 rotated to a selected position is retained in that position by an engaging mechanism 20 having a positioning element 21 mounted inside the frame 2. A brake lever 10 is pivotally connected to a bracket 9 formed integral with and of the same material as the frame 2. Thus, the shifting apparatus may be attached along with the brake lever 10 to the handlebar 1. In other words, this is a shifting apparatus having a brake lever. By operating the control member 8 to rotate the takeup element 3, the inner wire 6a of the control cable 6 is pulled or relaxed to switch the change gear device of the bicycle. At the same time, an indicator 30 having a rotatable member 31 attached to the frame 2 allows the cyclist to discern a speed stage provided by the change gear device. Details of this apparatus will be described hereinafter.

Figure 2:
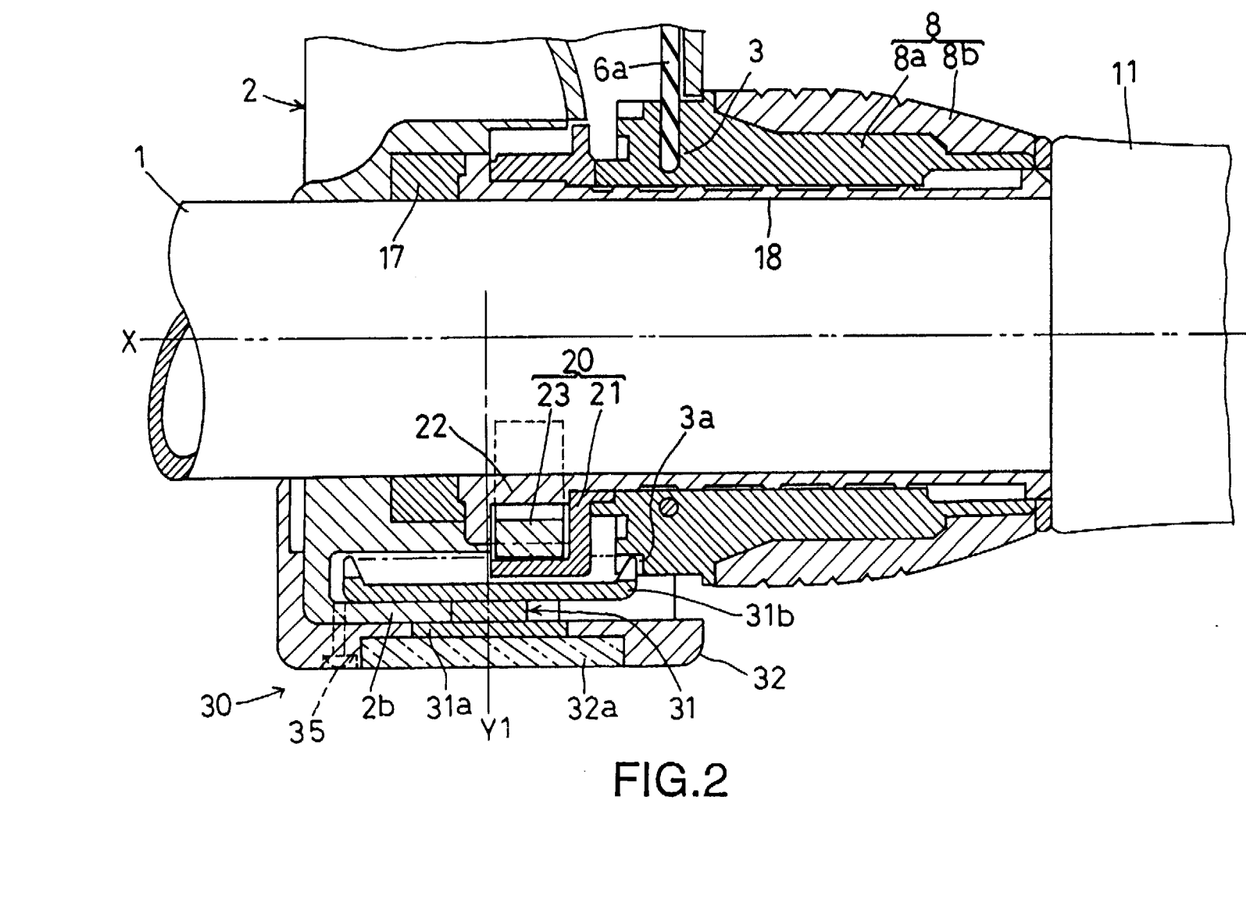
FIG. 2 is a sectional view of a speed indicator of FIG. 1.

As best shown in FIG. 2, the control member 8 is a tubular member including a tubular inner portion 8a formed integral with the frame 2, and an outer portion 8b mounted on the inner portion 8a. The control member 8 is rotatably mounted on a support tube 18 unrotatably supported by the frame 2 through a connecting member 17 and mounted on the handlebar 1. Specifically, the support tube 18 is mounted along with the frame 2 on the handlebar 1, with the takeup element 3 mounted inwardly of a grip 11 of the handlebar 1 and inwardly of the control member 8. Thus, the cyclist may easily rotate the control member 8 forward or backward with the thumb and/or finger of the hand holding the grip 11.

When the control member 8 is rotated forward about substantially the same axis X as that of the handlebar 1, the takeup element 3 also rotates forward with the control member 8. Then, the takeup element 3 winds the inner wire 6a thereon and pulls the inner wire 6a. When the control member 8 is rotated backward, the takeup element 3 also rotates backward to unwind the inner wire 6a therefrom and relax the inner wire 6a.

Figure 3:
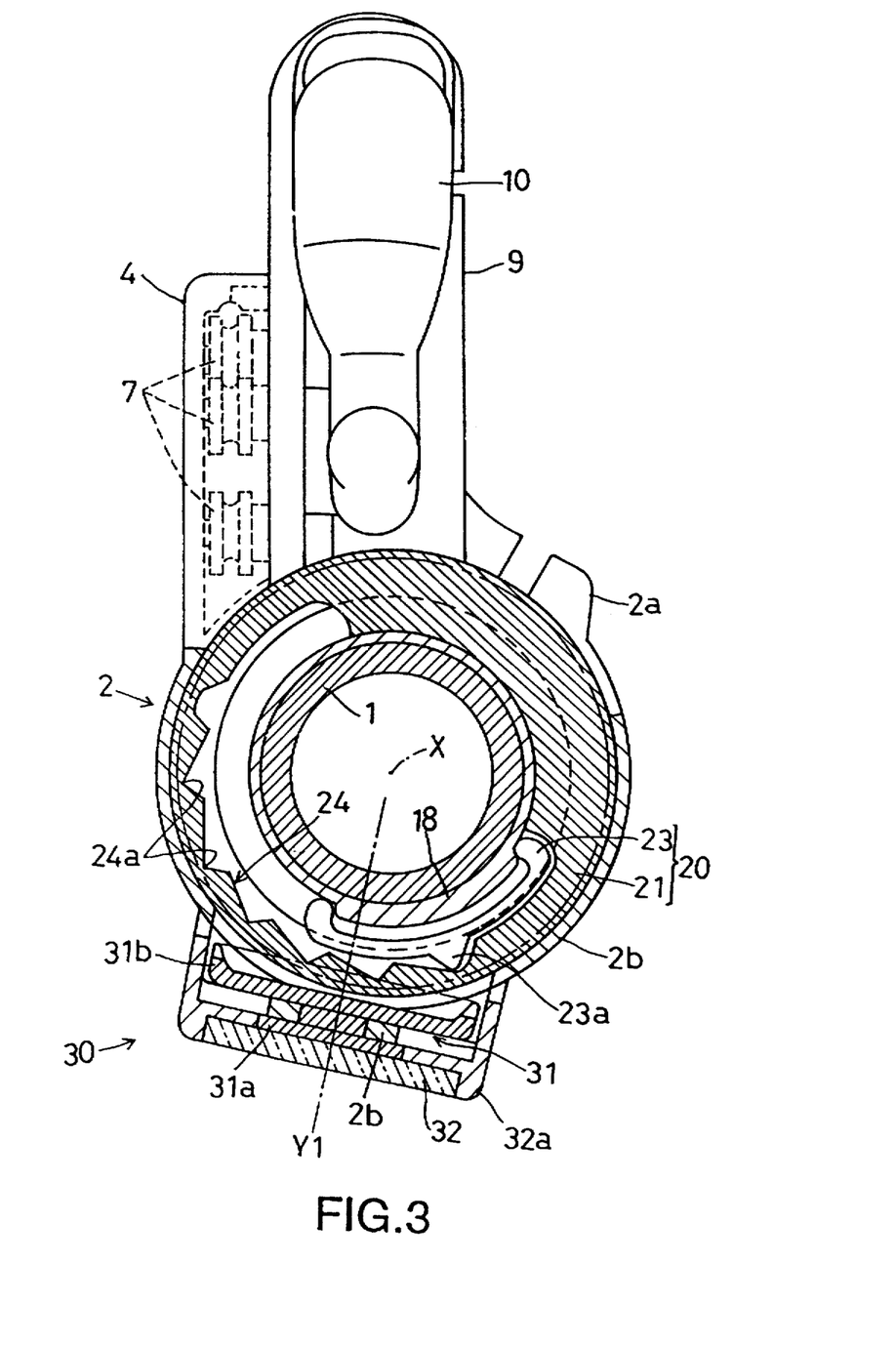
FIG. 3 is a sectional view of an engaging mechanism for engaging an inner wire takeup element.

As shown in FIGS. 2 and 3, the engaging mechanism 20 includes an annular positioning element 21 rotatable with the takeup element 3, and an engaging element 23 unrotatably supported by the support tube 18. The positioning element 21 extends from the takeup element 3 away from the control member 8, and the engaging element 23 is disposed inside the positioning element 21. The positioning element 21 has a tongue 21a engaging one end of the takeup element 3 to be rotatable with the takeup element 3. The positioning element 21 defines, on an inner peripheral wall thereof, ratchet teeth 24 having tooth bottoms 24a corresponding in number to the speed stages provided by the change gear device. When the takeup element 3 is rotated by a torque exceeding a predetermined force, the positioning element 21 rotates with the takeup element 3. At this time, the engaging element 23 is elastically deformed by the pressure of a ratchet tooth 24 acting on an engaging pawl 23a of the engaging element 23. The engaging pawl 23a moves from a bottom 24a onto a top of the ratchet tooth 24. Then, the engaging element 23 is temporarily disengaged from the positioning element 21. When the takeup element 3 reaches a selected angular position, the engaging pawl 23a moves into a corresponding bottom between ratchet teeth 24 under an elastic restoring force of the engaging element 23. Then, the engaging element 23 engages the positioning element 21, and stops the takeup element 3 through the positioning element 21.

Figure 4:
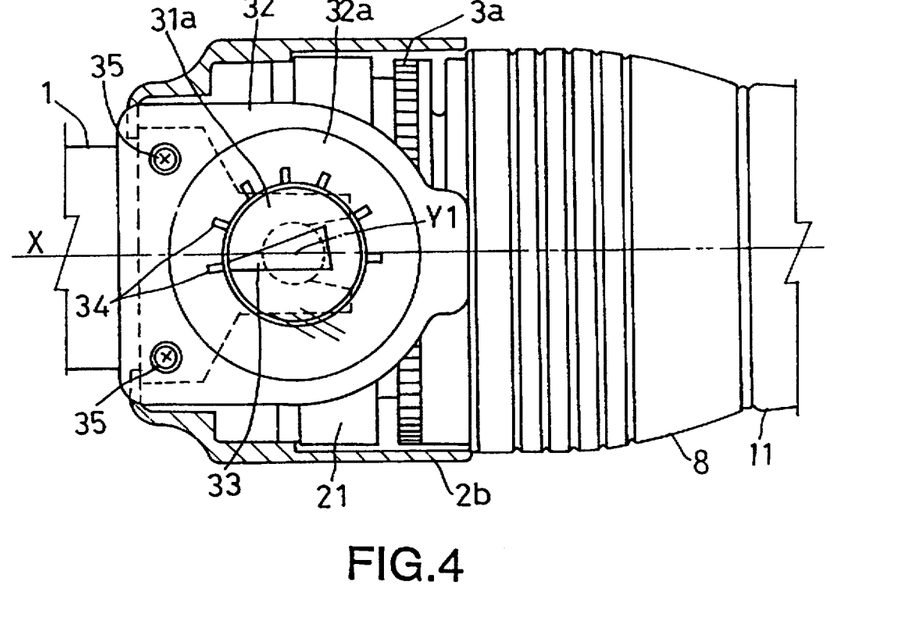
FIG. 4 is an explanatory view of a display portion of the indicator.

As shown in FIGS. 2 and 3, the indicator 30 includes the rotatable member 31 rotatably mounted on a support portion 2b of the frame 2, and a fixed member 32 fastened to the frame 2 by mounting screws 35. The rotatable member 31 includes a disk-shaped pointer portion 31a. The fixed member 32 includes a portion 32a formed of a transparent material and disposed above the pointer portion 31a. Thus, a pointer 33 (FIG. 4) on the pointer portion 31a is seen from outside. The fixed member 32 acts also as a lid for closing an opening of the frame 2 which accommodates the rotatable member 31. The rotatable member 31 is mounted on the support portion 2b to be rotatable about an axis Y1 shown in FIG. 2. The rotatable member 31 has a crown gear 31b provided as an input thereof and meshed with a gear 3a of the takeup element 3. When the takeup element 3 is rotated, the rotatable member 31 rotates about the axis Y1 which extends substantially perpendicular to the rotational axis X of the control member 8, and hence the pointer 33 also turns at the same time. When the takeup element 3 reaches a selected angular position to switch the change gear device to a selected speed stage, the pointer 33 turns to an angular position indicating one, corresponding to the selected speed stage of the change gear device, of a plurality of speed marks 34 provided on the fixed member 32 (FIG. 4).

Thus, the indicator 30 includes the rotatable member 31 which is separate from the control member 8 and takeup element 3 and mounted on the frame 2, and the fixed member 32 attached to the frame 2, and indicates a selected speed stage of the change gear device based on a combination of the pointer 33 on the rotatable member 31 and a speed mark 34 on the fixed member 32. The rotatable member 31 is rotatable about the axis Y1 extending substantially perpendicular to the rotational axis X of the control member 8. Further, the rotatable member 31 is interlocked to the takeup element 3, so that a torque of the control member 8 is transmitted to the rotatable member 31 through the takeup element 3. The indicator 30 has a rotational axis, which is the rotational axis Y1 of the rotatable member 31, extending substantially perpendicular to the rotational axis X of the control member 8. Where the handlebar 1 is a flat bar, the indicator 30 has a display plane facing rearward to facilitate view by the cyclist. Furthermore, where the handlebar 1 is a flat bar, the rotational axis Y1 and the brake lever 10 are in such a positional relationship that the display plane is inclined and extends obliquely upward to be seen with greater facility.

Figure 5:
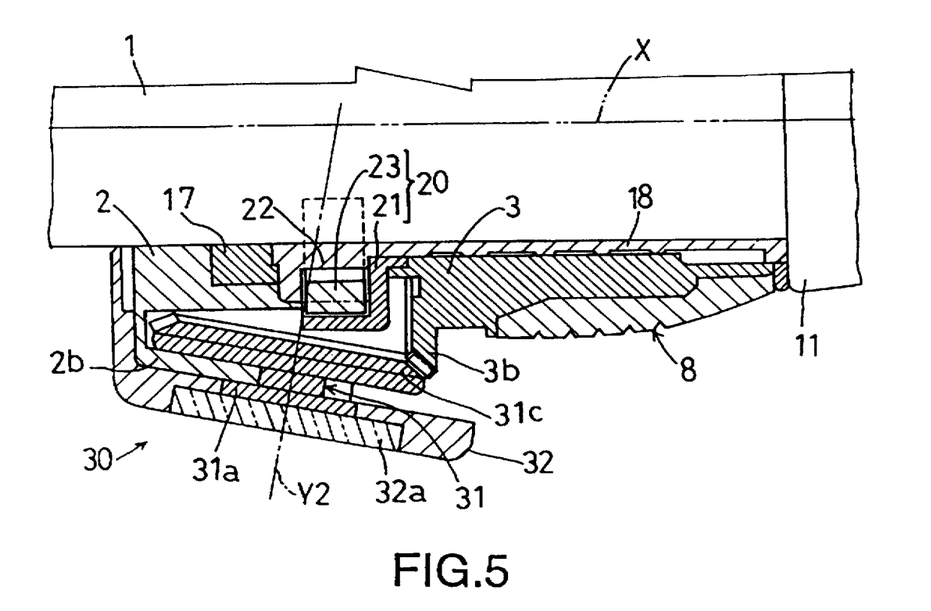
FIG. 5 is a sectional view of a modified speed indicator.

FIG. 5 shows a shifting apparatus having an indicator structure different from the first embodiment.

In this embodiment, an indicator 30 has a rotatable member 31 supported by the support portion 2b of the frame 2 to be rotatable about an axis Y2 substantially crossing at an angle to the rotational axis X of the control member 8. The rotatable member 31 has an input 31c in the form of a bevel gear meshed with a bevel gear 3b of a takeup element 3.

Thus, the rotatable member 31 is formed separately from the control member 8, and interlocked to the takeup element 3 to be rotatable by a torque transmitted from the control member 8 through the takeup element 3. The indicator 30 indicates a selected speed stage of the change gear device based on a combination of a pointer 33 on the rotatable member 31 and one of speed marks 34 on a fixed member 32. The indicator 30 has a rotational axis, which is the rotational axis Y2 of the rotatable member 31, substantially crossing the rotational axis X of the control member 8. Where the handlebar 1 is a flat bar, the indicator 30 has a display plane facing rearwardly and extending obliquely upward to facilitate view by the cyclist. As shown in FIG. 5, the display plane is inclined inwardly of the bicycle.

Figure 7:
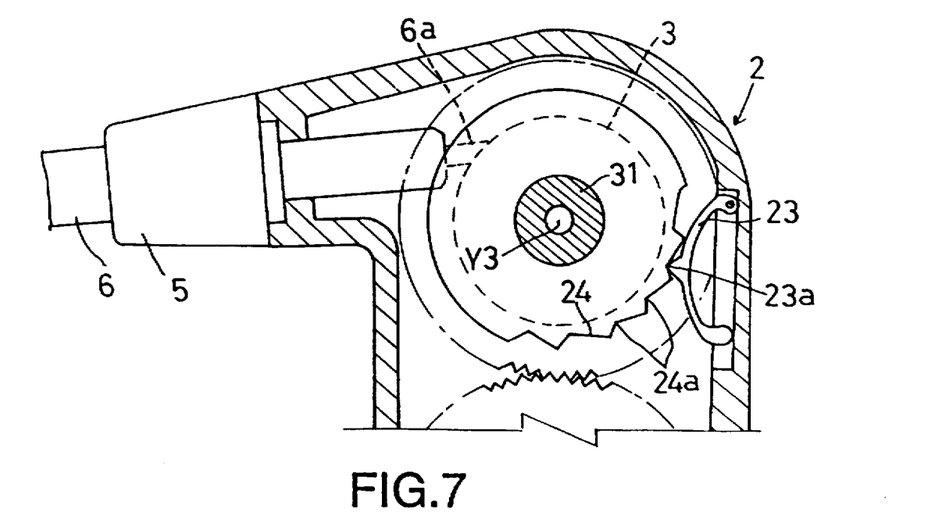
FIG. 7 is a sectional view of an engaging mechanism mounted in the shifting apparatus of FIG. 6.
Figure 8:
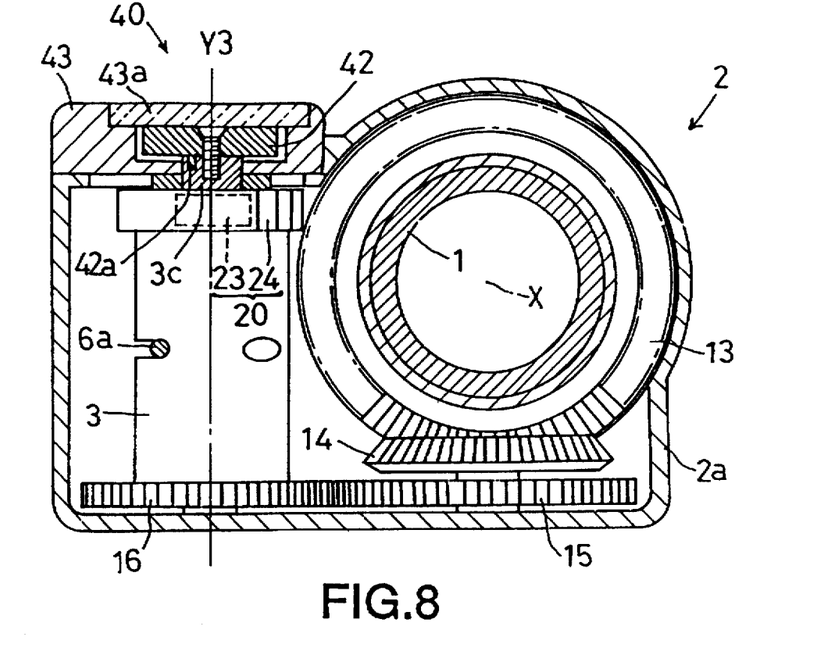
FIG. 8 is a sectional view of a takeup element mounted in the shifting apparatus of FIG. 6.

In the foregoing embodiments, the takeup element 3 is disposed on the rotational axis X of the control member 8. Thus, the takeup element 3 and control member 8 may be assembled to the handlebar 1 as arranged along the rotational axis X. This construction provides the advantage of assembling the entire shifting apparatus compact on the handlebar 1. However, the invention may be embodied as shown in FIGS. 6 through 8.

Figure 6:
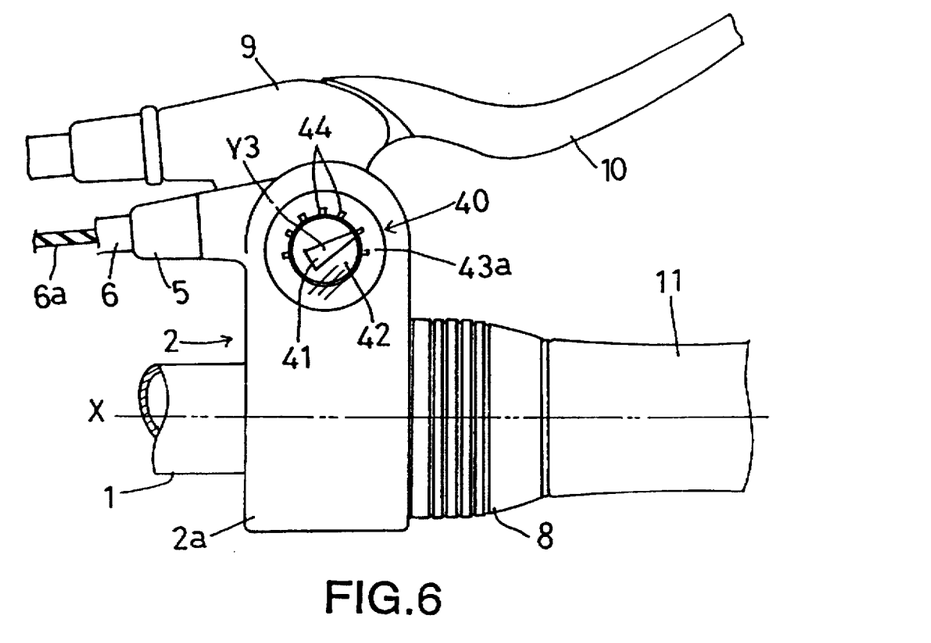
FIG. 6 is a sectional view of a shifting apparatus in another embodiment of the present invention.

In the shifting apparatus for a bicycle shown in FIG. 6, a frame 2 has a band 2a fastened tight to a bicycle handlebar 1 inwardly of a grip 11. A control member 8 is rotatably mounted adjacent a side of the frame 2. As shown in FIGS. 6 and 7, the frame contains and covers a takeup element 3 and an engaging mechanism 20 arranged forwardly of the band 2a. An indicator 30 is disposed in a similar position. As clearly seen in FIG. 8, rotation of the control member 8 is transmitted to the takeup element 3 and engaging mechanism 20 arranged forwardly, through a bevel gear 13 rotatable with the control member 8, a bevel gear 14 meshed with the bevel gear 13, a spur gear 15 rotatable with the bevel gear 14, and a spur gear 16 meshed with the spur gear 15. An outer tube of a control cable 6 extending from a change gear device of the bicycle is supported by an outer holder 5 provided on the frame 2. An inner wire 6a of the control cable 6 extends into the frame to be connected to the takeup element 3. By operating the control member 8 to rotate the takeup element 3, the inner wire 6a of the control cable 6 is pulled or relaxed to switch the change gear device. An indicator 40 allows the cyclist to discern a speed stage provided by the change gear device.

In this embodiment, the indicator 40 is rotatable about the same axis as the takeup element 3. With use of both bevel gears and spur gears, the indicator 40 and takeup element 3 are spaced from the rotational axis of the control member 8. This construction has the advantage of allowing a freedom for arranging the indicator 40 over the case of using only bevel gears so that the rotational axis of the indicator 40 crosses the rotational axis of the control member 8. Details of the construction of this embodiment are as follows.

The control member 8 has a tubular configuration coaxial with a handlebar receiving bore of the band 2a, and is rotatably mounted on the handlebar 1 inwardly of the grip 11. The control member 8 is rotatable forward and backward.

As shown in FIG. 8, the bevel gear 13 provided at one end of the control member 8 is interlocked through the bevel gear 14 and spur gear 15 to the spur gear 16 provided at a lower end of the takeup element 3. Thus, when the control member 8 is rotated forward, the takeup element 3 rotates forward about rotational axis Y3. The takeup element 3 then winds the inner wire 6a thereon and pulls the inner wire 6a. When the control member 8 is rotated backward, the takeup element 3 also rotates backward to unwind the inner wire 6a therefrom and relax the inner wire 6a.

As shown in FIG. 7, the engaging mechanism 20 includes ratchet teeth 24 formed peripherally of the takeup element 3 and having tooth bottoms 24a corresponding in number to the speed stages provided by the change gear device, and an elastic engaging element 23 mounted on an inner wall of the frame 2. When the takeup element 3 is rotated by a torque exceeding a predetermined force, the engaging element 23 is elastically deformed by the pressure of a ratchet tooth 24 acting on an engaging pawl 23a of the engaging element 23. The engaging pawl 23a moves from a bottom 24a onto a top of the ratchet tooth 24. Then, the engaging element 23 is temporarily disengaged from the ratchet teeth 24. When the takeup element 3 reaches a selected angular position, the engaging pawl 23a moves into one of the tooth bottoms 24a under an elastic restoring force of the engaging element 23. Then, the engaging element 23 engages a ratchet tooth 24 to stop the takeup element 3.

As shown in FIGS. 6 and 8, the indicator 40 includes a rotatable member 42 attached to an upper end of the takeup element 3 and having a pointer 41 as shown in FIG. 6, and a fixed member 43 fastened to the frame 2 by screws. The fixed member 43 includes a portion 43a formed of a transparent material and disposed above the rotatable member 42. Thus, the pointer 41 is seen from outside. The fixed member 43 acts also as a lid for closing an opening of the frame 2 which accommodates the takeup element 3. The rotatable member 42 is attached to the upper end of the takeup element 3 by screws. In addition, the rotatable member 42 is interlocked to the takeup element 3 through engagement between a stopper pin 42a on the rotatable member 42 and a mounting shank 3c on the takeup element 3. When the takeup element 3 is rotated, the rotatable member 42 rotates with the takeup element 3 about the common axis Y3, and hence the pointer 41 also turns at the same time. When the takeup element 3 reaches a selected angular position to switch the change gear device to a selected speed stage, the pointer 41 turns to an angular position indicating one, corresponding to the selected speed stage of the change gear device, of a plurality of speed marks 44 provided on the fixed member 43 (FIG. 6).

Thus, the indicator 40 is formed separately from the control member 8, and mounted on the frame 2 to be rotatable on the axis Y3 different from the rotational axis X of the control member 8. This indicator 40 includes the rotatable member 42 interlocked to the takeup element 3, and the fixed member 43 attached to the frame 2. The indicator 40 receives a torque from the control member 8 through the takeup element 3. A speed stage of the change gear device is indicated by a combination of the pointer 41 on the rotatable member 31 and a speed mark 44 on the fixed member 43. The indicator 40 has a rotational axis, which is the rotational axis Y3 of the rotatable member 42, different from the rotational axis X of the control member 8. Where the handlebar 1 is a flat bar, the indicator 40 has a display plane facing upward to facilitate view by the cyclist.

Figure 9:
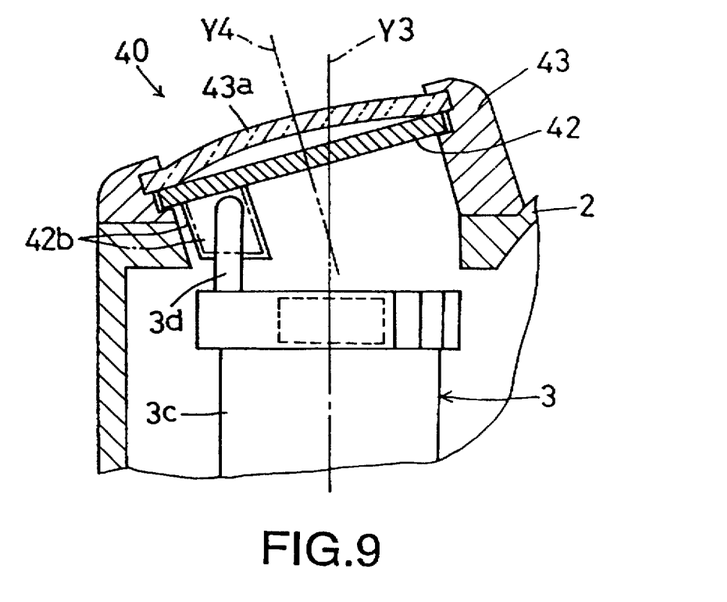
FIG. 9 is a sectional view of a speed indicator in a further embodiment.

FIG. 9 shows a modified indicator structure applicable to the embodiment of FIGS. 6 through 8. This indicator 40 is formed separately from the takeup element 3, and may therefore be positioned with an increased degree of freedom. For example, the indicator 40 may be inclined with respect to the axis of the takeup element 3. Details of this construction are as follows.

The indicator 40 has a rotatable member 42 attached to the frame 2 through a fixed member 43 to be rotatable about an axis Y4 substantially crossing the rotational axis Y3 of the takeup element 3. The rotatable member 42 includes a pair of driven members in the form of tongues 42b formed on a reverse side thereof, while the takeup element 3 includes a drive member in the form of pin 3d having a distal end thereof extending to a position between the driven tongues 42b. Thus, the rotatable member 42 is interlocked to the takeup element 3, whereby rotation of the takeup element 3 causes the rotatable member 42 to rotate about the axis Y4. That is, when the takeup element 3 rotates, the drive pin 3d makes slidable contact with and presses one of the driven tongues 42b, thereby transmitting a torque from the takeup element 3 to the rotatable member 42. Although the rotational axes Y3 and Y4 cross each other, the rotatable member 42 is rotatable in response to rotation of the takeup element 3. The pair of driven tongues 42b may be in the form of a cylinder opening downward.

Thus, the rotatable member 42 is formed separately from the control member 8 and takeup element 3, and is interlocked to the takeup element 3 to be rotatable by a torque of the control member 8 transmitted through the takeup element 3. A speed stage of the change gear device is indicated by a combination of a pointer 41 on the rotatable member 31 and a speed mark 44 on the fixed member 43. The rotational axis Y3 of the takeup element 3 is different from the rotational axis X of the control member 8. Furthermore, the rotational axis Y4 of the rotatable member 42, which is a rotational axis of the indicator 40, is different from the rotational axis Y3 of the takeup element 3. Consequently, the indicator 40 may be disposed with an increased degree of freedom. Where the handlebar 1 is a flat bar, the indicator 40 has a display plane facing obliquely upward and inclined inwardly of the bicycle, as shown in FIG. 9, to facilitate view by the cyclist.

The engaging mechanism 20 may be replaced by a friction mechanism for applying a frictional resistance to the takeup element to retain the takeup element in a selected angular position. Thus, these mechanisms are collectively called herein a positioning mechanism 20.

Figure 10:
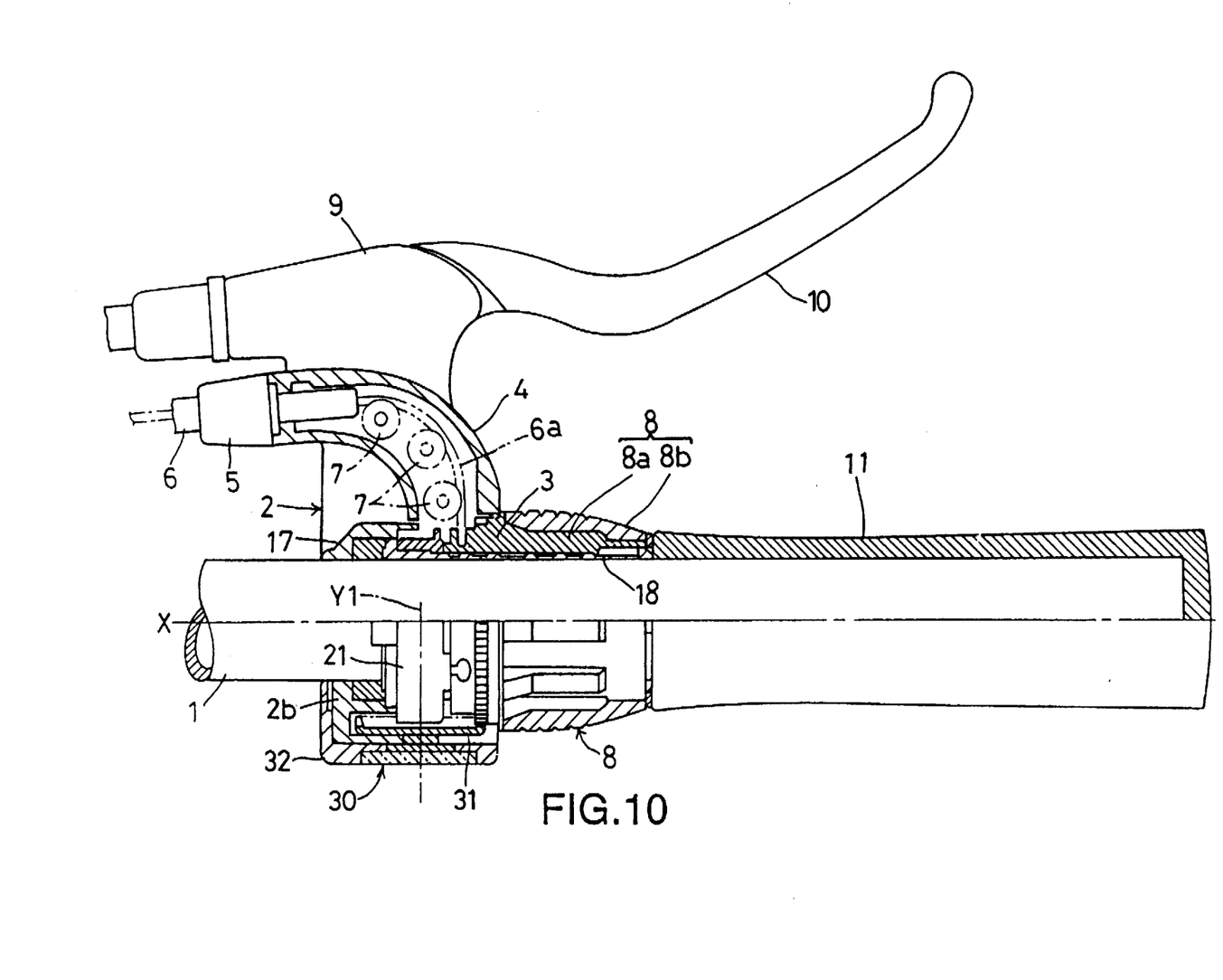
FIG. 10 is a view showing a modified mounting position of the inner wire takeup element.

As shown in FIG. 10, the inner wire takeup element 3 may be modified to have a gear 3a disposed outside the takeup element 3, i.e. between a wire winding portion and the control member 8. This construction allows an increased freedom for selecting a position of an inner wire inlet leading to the takeup portion. That is, the inlet may be formed in a lateral wall instead of an outer periphery of the takeup element 3 to facilitate insertion of the inner wire 6a. At the same time, this construction allows the crown gear 31b and indicator 30 to be arranged closer to the control member 8, thereby achieving compactness of the shifting apparatus.

The indicator described has a pointer provided on the rotatable member, and speed marks on the fixed member. Instead, the speed marks may be provided on the rotatable member, and the pointer on the fixed member.

The present invention is applicable also to a shifting apparatus for use on a handlebar curved to have grips extending longitudinally of a bicycle. The invention is applicable also to a shifting apparatus attachable to a handlebar separately from a brake lever. Further, the invention is applicable also to a shifting apparatus including a control member having such a length that an outward end thereof reaches one end of the handlebar, so that the control member acts as a rotatable grip in place of the handlebar grip 11 described hereinbefore.

What is claimed is:

1. A shifting apparatus adapted to be mounted on a bicycle handlebar extending coaxially with a first axis for controlling a change gear device through a cable connected to the change gear device, said shifting apparatus comprising:

an annular shift control member adapted to surround said handlebar for rotation around said handlebar and coaxially about said first axis;

a takeup element rotatable about said first axis to wind said cable thereon in response to rotation of said shift control member;

a positioning mechanism for retaining said takeup element in each angular position; and an indicator for indicating a speed stage of said change gear device in response to said angular position of said takeup element, said indicator being formed separately from said control member and said takeup element and rotatable about a second axis oriented differently from said first axis.

2. A shifting apparatus as defined in claim 1, further comprising:

a frame adapted to be supported by said handlebar and covering said takeup element;

a bracket provided to a side of said frame for pivotally supporting a brake lever; and said indicator being supported to said frame at a position on an opposite side from said side of said frame where said bracket is provided.

3. A shifting apparatus as defined in claim 1, wherein said takeup element is formed integral with and adjacent an inward end of said control member.

4. A shifting apparatus as defined in claim 1, wherein said second axis extends substantially perpendicular to said first axis.

5. A shifting apparatus as defined in claim 1, wherein said second axis is inclined with respect to a plane extending perpendicular to said first axis.

6. A shifting apparatus as defined in claim 1, wherein said indicator includes a rotatable member, a rotation of said control member being transmitted to said rotatable member through a pair of gears.

7. A shifting apparatus as defined in claim 1 wherein said positioning mechanism includes ratchet teeth formed integral with said control member, and an engaging element supported on said handlebar to be engageable with said ratchet teeth.

8. A shifting apparatus as defined in claim 1, further comprising a frame supported by said handlebar and covering said takeup element, wherein said indicator includes a fixed member supported by said frame.

9. A shifting apparatus as defined in claim 8, further comprising a bracket extending from said frame for pivotally supporting a brake lever.

10. A shifting apparatus as defined in claim 9, wherein said frame and said bracket are formed of an identical material to be integral with each other.

11. A shifting apparatus adapted to be mounted on a bicycle handlebar for controlling a change gear device through a cable connected to the change gear device, said shifting apparatus comprising:

an annular shift control member adapted to surround said handlebar for rotation around said handlebar and coaxially about a first axis;

a takeup element rotatable in response to rotation of said shift control member, about a second axis different from said first axis, to wind said cable thereon, said takeup element having a first end for receiving the rotation of said shift control member through an interlock mechanism, and a second end opposite from said first end;

a positioning mechanism for retaining said takeup element in each angular position; and     an indicator for indicating a speed stage of said change gear device in response to said angular position of said takeup element, said indicator being connected to said second end of said takeup element;

wherein said interlock mechanism is positioned between said control member and said takeup element and includes an intermediate member formed separately from said control member and said takeup element for engaging said control member and said takeup element.

12. A shifting apparatus as defined in claim 11, wherein said indicator includes a rotatable member interlocked to said takeup element.

13. A shifting apparatus as defined in claim 12, wherein said indicator has a third axis different from said second axis.

14. A shifting apparatus as defined in claim 13, wherein said takeup element includes a drive member extending from a position at said second end of said takeup element offset from said second axis, said rotatable member of said indicator including a driven member engageable with said drive member.

15. A shifting apparatus as defined in claim 14, wherein said drive member and said driven member are both elongated members slidingly engaged with each other in order to maintain engagement between said drive member and said driven member regardless of a variation in distance therebetween occurring with rotation of said takeup element.

16. A shifting apparatus as defined in claim 11, further comprising a frame supported by said handlebar and covering said takeup element, wherein said indicator includes a fixed member supported by said frame.

17. A shifting apparatus as defined in claim 16, further comprising a bracket extending from said frame for pivotally supporting a brake lever.

18. A shifting apparatus as defined in claim 17, wherein said frame and said bracket are formed of an identical material to be integral with each other.

19. A shifting apparatus according to claim 11 wherein said intermediate member comprises a gear.

\* \* \* \* \*